United States Patent [19]

Wood

[11] 4,322,169

[45] Mar. 30, 1982

[54] CLAY MIXING APPARATUS

[76] Inventor: Randolph C. Wood, 9460 Carmel Rd., Atascadero, Calif. 93422

[21] Appl. No.: 158,940

[22] Filed: Jun. 12, 1980

[51] Int. Cl.³ .......................... B29B 5/00; B29B 1/06

[52] U.S. Cl. .......................................... 366/77; 366/99; 366/295

[58] Field of Search ...................... 366/50, 51, 52, 64, 366/77, 79, 186, 190, 194, 195, 310, 318, 322, 323, 99, 97, 98, 295; 425/207, 208, 516, 376 R, 376 B

[56] References Cited

U.S. PATENT DOCUMENTS

| | | | |
|---|---|---|---|
| 842,206 | 1/1907 | Lowry | 366/40 |
| 3,145,977 | 8/1964 | August | 366/44 |
| 3,180,628 | 4/1965 | Pullin | 366/46 |
| 3,323,570 | 6/1967 | Tullock | 366/186 |
| 3,548,903 | 12/1970 | Holly | 366/186 |
| 3,606,277 | 9/1971 | Kader | 366/50 |
| 3,932,086 | 1/1976 | Kasamatsu | 425/208 |
| 4,097,926 | 6/1978 | Face | 366/46 |

*Primary Examiner*—Robert W. Jenkins
*Attorney, Agent, or Firm*—James E. Brunton

[57] ABSTRACT

A combination clay mixing and extruding apparatus for mixing dry powders and water to form a moist clay which can alternately be held in the mixing chamber, or, as desired, can be automatically extruded into cylindrically shaped logs. Due to the unique design of the apparatus, the extrusion operation is commenced by merely reversing the direction of rotation of the drive means of the device. For more compactness, the unit embodies in-line mixing and extrusion chambers. A unitary shaft drives both the mixing blades of the mixing chamber and the extruding auger of the extrusion chamber. The shaft is cantilevered within the chambers and is journaled in bearings located exteriorly of the chambers so as to protect them from the abrasive and corrosive effects of the powder and water.

6 Claims, 2 Drawing Figures

CLAY MIXING APPARATUS

BACKGROUND OF THE INVENTION

1. Field of the Invention

The present invention relates generally to devices for mixing and extruding plastically workable ingredients. More particularly the invention relates to a novel apparatus for producing moist clay by mixing water and dry powder and for automatically and continuously extruding the clay mixture into elongated cylindrically shaped extrusions, or logs.

2. Discussion of the Prior Art

Numerous types of dough type mixing devices for mixing water and dry powders to produce clay have been suggested. Similarly, various devices, generally known as "pug mills", have been devised for extruding the moist clay, or "pug" into cylindrical extrusions, or "logs". Generally, the prior art pug mills are unsatisfactory for the mixing operation due to their small size and due to the design of their impeller blades. Similarly, prior art mixing devices, while suitable for mixing, cannot be used for extruding the clay into a conveniently usable form.

The apparatus of the present invention is unique in that the initial operation of the device is that of a dough type clay mixer, while the secondary operation is that of a pub mill device.

The design of the device is such that either dry powder, or wet clay can be introduced into the mixing chamber. Mixing is accomplished by rotating the unitary shaft of the device in a first direction. So long as the shaft is rotating in this direction, the clay will be efficiently and effectively mixed by mixing blades of novel design. When the rotation of the shaft is reversed, the uniquely configured mixing blades will urge the clay mixture forwardly of the apparatus toward a helical screw or auger which carries it into a coaxially disposed extrusion chamber. The pug mill auger will then force the clay through a reduction cone and extrude it automatically and continuously into easy to handle logs, which may be formed into any desired shape.

The diameter of the mixing chamber of the apparatus is greatly enlarged over that of the pug mill to accomplish efficient and thorough mixing. By periodically adding water through the ample material inlet, the clay can be "held" in the mixing chamber for substantial periods of time. The clay can then be fed into the extruder as material is needed by the operator by simply reversing the direction of the motor which drives the common drive shaft. In essence, the apparatus of the invention embodies all the advantages of the prior art mixers and pug mills while effectively overcoming the drawbacks of each.

The most pertinent prior art of which the applicant is familiar and which serves to demonstrate the novelty of the present invention is as follows: U.S. Pat. No. 4,097,926—Face; U.S. Pat. No. 3,180,628—Pullin; U.S. Pat. No. 3,606,277—Kader; U.S. Pat. No. 3,145,977—August; U.S. Pat. No. 3,548,903—Holly; U.S. Pat. No. 842,206—Lowry; U.S. Pat. No. 3,323,570—Tullock et al.

SUMMARY OF THE INVENTION

It is an object of the present invention to provide a single unitary apparatus adapted to mix dry ingredients to form a plastically workable material and to automatically deliver the material to the operator in a conveniently usable form with a minimum of handling.

It is another object of the invention to provide an apparatus of the aforementioned character in which the plastically workable material can either be held in the mixing chamber or delivered to the extrusion chamber simply by reversing the direction of rotation of the drive means.

It is still another object of the invention to provide a device as described in the previous paragraphs which embodies a single drive shaft adapted to rotate both the mixing blades of the apparatus as well as the extrusion auger.

It is another object of the invention to provide a device of the character described in the preceding paragraph in which the drive shaft is cantilevered within the mixing and extrusion chambers being journaled in bearings disposed exteriorly of the unit. In this way the bearings never come into contact with the plastic material being processed.

It is a further object to provide a device as heretofore described in which there is provided a frustoconically shaped transition section disposed intermediate the mixing and extrusion chambers to enable plastic material to be smoothly and efficiently transferred in-line from the mixing chamber into the axially aligned extrusion chamber.

Still another object of the invention is to provide a device of the class described in which the capacity of the mixing chamber is sufficient to enable continuous delivery of the plastic material to the extrusion chamber without the necessity of continuous manual feeding of the material.

Another object of the invention is to provide an apparatus as described in the previous paragraphs which is highly reliable, can be easily maintained and operated and which can be manufactured at minimum cost.

DESCRIPTION OF ONE EMBODIMENT OF THE INVENTION

Figure 1:
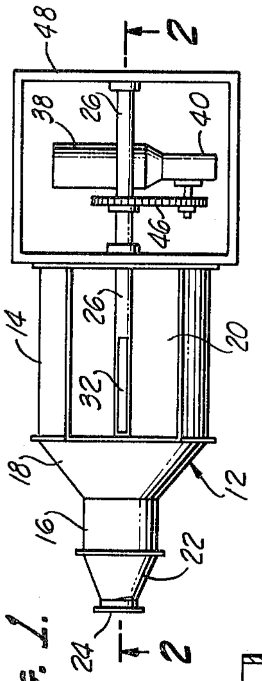
FIG. 1 is a plan view of the apparatus of the present invention for mixing and extruding plastically workable ingredients.

Referring to the drawings, the apparatus of the invention comprises an elongated housing 12 which is substantially circular in cross-section at any point. Housing 12 is divided into three cooperatively interconnected chambers, namely a mixing chamber 14, an extrusion chamber 16 and an intermediate transistion chamber 18. Mixing chamber 14 is generally cylindrical in shape and has a material inlet 20 formed in the upper wall thereof. Extrusion chamber 16 is also cylindrical in shape but has a diameter substantially smaller than the diameter of the mixing chamber. Affixed to the forward end of the extrusion chamber, and forming an integral part thereof, is a reduction cone 22 having a material outlet opening 24. Transistion chamber 18 is generally frustoconical in shape and interconnects the larger diameter mixing chamber 14 with the smaller diameter extrusion chamber 16. Housing 12 may be constructed of any suitable material such as steel or rigid plastic.

Figure 2:
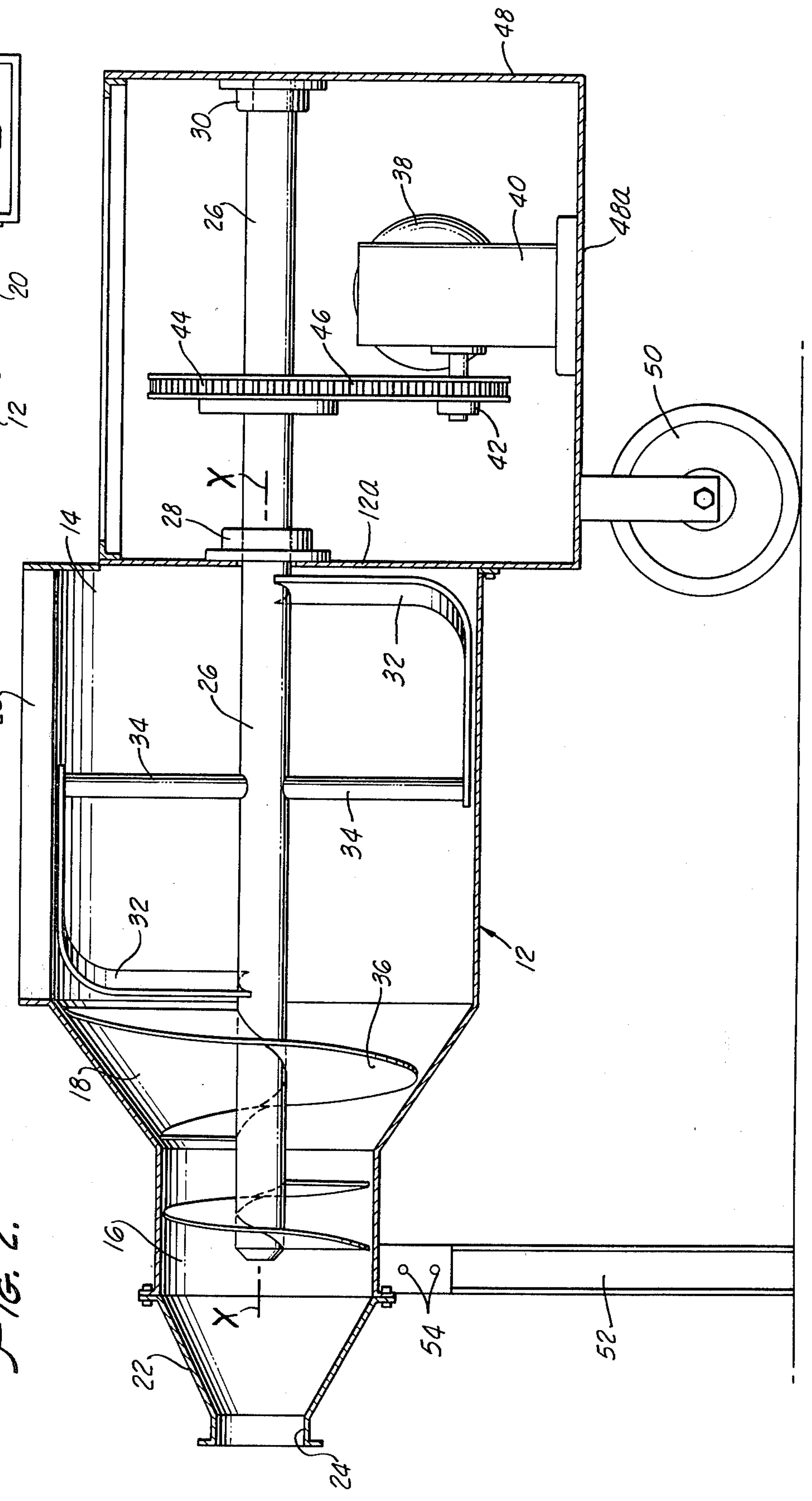
FIG. 2 is a greatly enlarged side elevational, cross-sectional view taken along lines 2—2 of FIG. 1 illustrating the configuration of the operating components of the apparatus.

Extending substantially the length of housing 12 is a unitary shaft 26 which is adapted for rotation about the longitudinal axis "X" of housing 12. As best seen in FIG. 2, shaft 26 is forwardly cantilevered within housing 14 and is journaled within a bearing 28 which is carried by the rear wall 12*a* of the housing. Bearing 28 is disposed exteriorly of housing 12 and cooperates with a second rearwardly spaced bearing 30 to rotatably support shaft 26. With this arrangement no forward bearing disposed interiorly of the housing is required and accordingly the bearings supporting the shaft are fully protected from the abrasive and corrosive effect of the powder and water ingredients being mixed in mixing chamber 14.

Disposed within mixing chamber 14 are mixing means provided in this embodiment of the invention in the form of a pair of curved mixing blades 32. Blades 32 are connected at their inboard ends to shaft 26 and at their opposite, outboard ends to radially outwardly extending support rods 34 which are in turn affixed at their inboard ends to shaft 26. Curved blades 32 have an outer radius substantially equal to the inner radius of mixing chamber 14 and, upon rotation of shaft 26 in a first direction, are configured to impart a uniform, gentle mixing action to the material contained within the mixing chamber. When the rotation of the shaft is reversed so as to rotate in a second direction, mixing blades 32 are adapted to impel the material within the mixing chamber forwardly of the unit in a direction toward the transistion chamber 18.

Disposed within the extrusion chamber 16 and transition chamber 18 are extruding means shown here in the form of a helically shaped screw or auger 36 which is connected to shaft 26 for rotation therewith. The configuration of auger 36 is such that upon rotation of shaft 26 in the second direction, the material received from mixing blades 32 will be acted upon by the auger to move it further forwardly of the apparatus in a direction toward cone 22. As can be seen in FIG. 2, the diameter of auger 36 at its rearward extremity is substantially equal to the inside diameter of mixing chamber 14. However, the auger diameter becomes progressively smaller toward its forward end so as to conform to the inside diameter of the transition chamber 18 and the extrusion chamber 16. This permits a uniform and efficient compression of the clay as it is moved forwardly of the apparatus.

Provided at the rear of housing 12, that is to the right as viewed in FIG. 2, are drive means for rotating shaft 26 either in a first or second direction. In the form of the invention shown in the drawings, the drive means comprises a variable speed, reversable electric motor 38 which is appropriately interconnected with suitable gear reduction means 40. A drive gear 42 provided on gear reduction means 40 drives a driven gear 44 affixed to shaft 26 by means of a suitable drive chain, or belt 46.

In the embodiment of the invention herein depicted and described, the drive means of the apparatus is carried within a protective housing 48 which is disposed rearwardly of, and fixedly interconnected with, housing 12. For ease of portability, a pair of rollers or wheels 50 are provided on the lower wall 48*a* of housing 48. To maintain the apparatus in a level configuration during operation, a supporting standard 52 depends from the forward end of the apparatus and is connected by suitable fasteners 54 to the lower wall of extrusion chamber 16.

In operation, with the apparatus disposed in the orientation shown in FIG. 2, the powder to be mixed, for example, a fine powdered clay, is introduced into the mixing chamber through inlet 20. Motor 38 is then actuated to cause rotation of shaft 26 in a first direction. Water is then added to the powder mixture. So long as shaft 26 is rotating in the first direction, the uniquely configured mixing blades 32 will efficiently and thoroughly mix the water with the powder to form a plastic clay material of the consistency desired. The material will remain within the mixing chamber and will continue to be mixed until rotation of shaft 26 is reversed.

When it is desired to commence the extrusion of the material from the apparatus for use by the operator, the direction of rotation of motor 38 is reversed by means of a suitable interconnected switch. This will cause shaft 26 to rotate in the second direction. When rotating in this direction, the configuration of blades 32 is such as to urge the moist clay forwardly of the apparatus into engagement with auger 36. Since auger 36 is also rotating with shaft 26 it will, because of its unique configuration, cooperate with blades 32 to urge the moist clay further forwardly of the apparatus through the transition chamber 18 and into the extrusion chamber 16. Because of the sloping side walls of the frustoconically shaped transition chamber 18, the material will be smoothly and uniformly compressed, and will completely fill the extrusion chamber 16. Continued rotation of shaft 26 and auger 36 will cause material to be urged still further forwardly of the apparatus under a sufficient amount of pressure to force it into reduction cone 22 and outwardly through outlet 24. With this construction, the clay emerges from the unit in the form of a homogeneous and highly uniform, cylindrical shaped extrusion, or log. If desired, the log may be formed into various shapes.

The extrusion emerging from the apparatus may be immediately used, or it may be packaged for later use. By allowing continued rotation of the shaft in the second direction, all of the material within the mixing chamber can be extruded from the apparatus at one time. Alternatively, if the operator desires to stop the extrusion process, all he needs do is reverse the direction of rotation of motor 38 and shaft 26. Upon reversal of rotation of the shaft, mixer blades 32 and auger 36 will reverse the direction of travel of the material and will resist further forward movement of the material within the apparatus. In this mode the material remaining in the mixing chamber will continue to mix until the direction of rotation of the shaft is once more reversed so as to permit the material to be extruded through outlet 24.

Material can be added to the mixing chamber at any time during the mixing mode or the apparatus can be operated strictly on a batch basis with each batch being separately mixed and extruded. While the mixing of clay is discussed herein, it is to be understood that the apparatus can be used to mix various types of materials including resins, paper pulp, plastics, food products and other types of plastically workable ingredients.

Having now described the invention in detail in accordance with the requirements of the patent statutes, those skilled in this art will have no difficulty in making changes and modifications in the individual parts of their relative assembly in order to meet specific requirements or conditions. Such changes and modifications may be made without departing from the scope and spirit of the invention, as set forth in the following claims.

I claim:

1. A device for mixing and extruding plastically workable ingredients, comprising:
(a) a substantially horizontally disposed mixing chamber having a material inlet;
(b) a coaxially aligned substantially horizontally disposed spaced apart extrusion chamber having a material outlet, said extrusion chamber being operably interconnected with said mixing chamber to form an integral enclosure;
(c) material mixing means disposed within said mixing chamber, said mixing means being rotatable in a first and second direction about the longitudinal axis of said mixing chamber and comprising a pair of horizontally spaced apart radially extending curved mixing blades each said blade being constructed and arranged to impart a mixing action to the material within said mixing chamber upon rotation of said mixing means in said first direction and each being provided with an angularly disposed face adapted to urge the material within said mixing chamber toward said extrusion chamber only upon rotation of said mixing means in said second direction, whereby said material is retained in said mixing chamber until said mixing means is rotated in said second direction; and
(d) material extruding means disposed within said extrusion chamber, said extruding means being rotatable about an axis coincidental with the axis of said mixing chamber and including material impelling means, said material impelling means comprising a substantially horizontally disposed, conically shaped helix constructed and arranged to receive the material from said mixing means only upon rotation of said mixing means in a second direction and continuously urge the material toward said material outlet.

2. A device as defined in claim 1, including:
(a) a unitary shaft disposed interiorly of said mixing chamber and said extrusion chamber and extending substantially the combined length thereof for rotation about the longitudinal axis of said enclosure, said shaft being adapted to impart rotational movement to said material mixing means and to said material extruding means; and
(b) drive means for rotating said shaft in a first and second direction.

3. A device as defined in claim 2 in which said unitary shaft is cantilevered within said enclosure and is journaled within a bearing disposed externally thereof.

4. A device as defined in claim 2 in which:
(a) said mixing chamber is substantially cylindrically shaped having a first diameter;
(b) said extrusion chamber is substantially cylindrically shaped having a diameter smaller than said first diameter of said mixing chamber; and
(c) said device includes a generally frustoconically shaped transition chamber disposed intermediate said mixing chamber and said extrusion chamber.

5. A device for mixing and extruding plastically workable ingredients comprising:
(a) an elongated housing defining:
(1) a horizontally disposed, generally cylindrically shaped mixing chamber having a material inlet;

(2) a horizontally disposed, generally cylindrically shaped, coaxially aligned reduced diameter extrusion chamber having a material outlet; and
(3) a generally frustoconically shaped transition chamber interconnecting said mixing chamber and said extrusion chamber;
(b) material mixing means disposed within said mixing chamber, said mixing means being rotatable about the longitudinal axis of said housing and including material working means adapted to mix the material within said mixing chamber only upon rotation of said mixing means in a first direction and being adapted to impel the material toward said transition chamber only upon rotation of said mixing means in a second direction, said material mixing means comprising a pair of generally radially extending mixing blades each said mixing blade having a curved face and having an outer radius substantially equal to the inner radius of said mixing chamber, said blade being configured to impart a mixing action to the material within said mixing chamber only upon rotation of said mixing means in the first direction and being adapted to impel the material toward said transition chamber only upon rotation of said mixing means in the second direction, whereby said material is retained in said mixing chamber until said mixng means is rotated in a second direction;
(c) material extruding means disposed within said transition chamber and said extrusion chamber, said extruding means being rotatable about the longitudinal axis of said housing and including material impelling means adapted to receive the material from said mixing chamber and impel it toward said material outlet only when said mixing means is rotating in said second direction.

6. A device for mixing moist clay from dry powder and extruding the mixture to the user in the form of an elongated cylindrical extrusion, comprising:
(a) an elongated horizontally disposed housing which is substantially circular in cross-section at any point defining:
(1) a generally cylindrically shaped mixing chamber having a material inlet;
(2) a longitudinally spaced apart generally cylindrically shaped, coaxially aligned reduced diameter extrusion chamber having a material outlet; and
(3) a generally frustoconically shaped transition chamber disposed intermediate of and interconnecting said mixing chamber and said extrusion chamber;
(b) a horizontally disposed unitary shaft extending substantially the entire length of said housing for rotation in a first and second direction about the longitudinal axis thereof, said shaft being cantilevered within said housing and journaled within a bearing disposed externally of said housing;
(c) material mixing means disposed within said mixing chamber said mixing means being connected to said shaft and rotatable therewith and including material working means adapted to mix the material within said mixing chamber upon rotation of said shaft in a first direction and being adapted to impel the material toward said transition chamber only upon rotation of said shaft in a second direction, said material mixing means comprising at least one radially extending curved mixing blade affixed to said shaft and having an outer radius substantially equal to the inner radius of said mixing chamber, said blade being configured to impart a mixing action to the material within said mixing chamber only upon rotation of said shaft in the first direction and being adapted to impel the material toward said transition chamber only upon rotation of said shaft in a second direction, whereby upon rotation of said shaft in a first direction the material is retained within said mixing chamber;

(d) material extruding means disposed within said transition chamber and said extrusion chamber, said extruding means being connected to said shaft and rotatable therewith and including material impelling means adapted to receive the material from said mixing chamber and impel it toward said material outlet only when said shaft is rotating in said second direction, said material impelling means comprising a helically shaped screw connected to said shaft and rotatable therewith, said screw being adapted to pressurally urge said clay mixture toward said outlet only upon rotation of said shaft in a second direction; and (e) drive means for rotating said shaft in a first and second direction, said drive means being mounted exteriorly of said housing and comprising a variable speed, reversable motor and means interconnecting said motor with said shaft.

* * * * *